United States Patent [19]
Loh et al.

[11] 3,751,968
[45] Aug. 14, 1973

[54] SOLID STATE SENSOR

[75] Inventors: Jack C. Loh, Liverpool; Chih-shun Lu, Jamesville, both of N.Y.

[73] Assignee: Inficon Inc., East Syracuse, N.Y.

[22] Filed: Jan. 22, 1971

[21] Appl. No.: 108,796

[52] U.S. Cl. .................. 73/23, 73/27 R, 23/254 E
[51] Int. Cl. .................. G01n 31/04, G01n 31/06
[58] Field of Search .................. 73/23, 23.1, 26, 73/27; 23/232 E, 254 E, 255 E; 324/33, 65 P, 71 R, 71 SN; 252/623, 521; 338/34; 307/308; 317/246

[56] References Cited
UNITED STATES PATENTS

| | | | |
|---|---|---|---|
| 2,550,498 | 4/1951 | Rice | 324/33 |
| 2,652,532 | 9/1953 | Zemany | 324/33 |
| 2,795,716 | 6/1957 | Roberts | 324/33 X |
| 3,483,028 | 12/1969 | Bell et al. | 252/62.3 R |

FOREIGN PATENTS OR APPLICATIONS

| | | | |
|---|---|---|---|
| 974,924 | 11/1964 | United Kingdom | 324/33 |

Primary Examiner—Richard C. Queisser
Assistant Examiner—Stephen A. Kreitman
Attorney—Robert W. Fiddler

[57] ABSTRACT

A sensor for detecting given constituents of an atmosphere employing a solid state device formed by a glass-ceramic element having a depletion layer exposed to the atmosphere in which a given gas or vapor is to be sensed. The glass-ceramic sensor is formed with two terminals on opposite sides of the depletion layer and the terminals are connected into a circuit establishing a potential difference between the terminals across the depletion layer. By forming the glass-ceramic element of a material in which leakage currents between the terminals through the glass-ceramic sensing element will be produced by the presence of a given material in the atmosphere, sensing results.

19 Claims, 2 Drawing Figures

INVENTORS
JACK C. LOH
CHIH-SHUN LU
BY
ATTORNEY.

SOLID STATE SENSOR

BACKGROUND OF THE INVENTION

This invention relates to the art of vapor or gas detection in a given atmosphere, and more particularly to an improved solid state device for the detection of halogen containing gases such as Freons, Sulfur hexafluoride, chloroform, carbon tetrachloride, and the like.

A variety of situations exist, in which it is necessary to detect the presence of undesirable vapors or gases in an atmosphere, since the presence of these undesirable gases or vapors may be detrimental to the human occupants of the area being tested, or may indicate a malfunction in a given production process. Thus, by way of example, it is understood that refrigeration systems employing Freon as a refrigerant must be maintained as a selaed system, and loss of the refrigerant would interfere with the operation of the refrigeration system, and contaminate the surrounding atmosphere.

With a view to providing means for the detection of gases or vapors in an atmosphere, a number of different types of gas detectors have been evolved. These prior art detectors have in the past operated on a number of principles such as by 1) varying the thermal conductivity of a circuit component in response to gas presence, or 2) by ionization techniques involving an eleactron captor, or 3) the discharge of positive ions from an electrode in the tested atmosphere.

These prior art detectors have presented problems in that the thermal conductivity detectors were not specific to any given gases, and as a result provide readings not necessarily indicative of the presence of a given undesired gas. The electron captor type of detectors require a radioactive sensing element, which is relatively expensive, subject to rapid deterioration, and is regarded by some as providing a contaminant worse than the gas or vapors sought to be detected. The discharge of a positive ions type of detector requires relatively high voltages, with concomitantly increased costs of operation and manufacture, requiring relatively bulky power packs for portability, or access to high voltage sources.

DESCRIPTION OF THE INVENTION

It is with the above considerations in mind that the present solid state gas sensing device has been evolved for the detection of gases and vapors in a given atmosphere, and more particularly halogen containing gases.

It is accordingly among the primary objects of this invention to provide an improved gas or vapor sensor employing a solid state device, requiring relatively small power supply sources.

A further object of the invention is to provide improved means for the detection of gases or vapors in an atmosphere which may be made specific to the halogen containing gases.

A further object of the invention is to provide gas detecting means subject to being embodied in relatively small compact portable apparatus, adapted to be readily carried to a site to be investigated for the presence of a given gas or vapor.

Another object of the invention is to provide a gas or vapor detector having a relatively long life, and not subject to rapid deterioration in use.

These and other objects of the invention which will become hereafter apparent are achieved by providing a sensor formed of a solid state device comprising a glass-ceramic element having a depletion layer exposed to the atmosphere in which gases are to be sensed. The glass-ceramic sensing element is provided with a terminal contacting the depletion layer, which terminal is hereinafter referred to as the "depletion layer terminal", and a terminal on the glass-ceramic element remote from the depletion layer which terminal is hereinafter referred to as the "element terminal". A circuit is formed between the element terminal and the depletion layer terminal and a potential difference is established between the terminals. A heater circuit is set up adjacent the depletion layer to heat the atmosphere adjacent the depletion layer.

A feature of the invention resides in the fact that the depletion layer may be formed over the surface of the sensing element so that extremely high sensitivity is obtained dependent on surface effects rather than bulk effects.

Another feature of the invention resides in the fact that the sensor is formed with all components in rigid contact so as to minimize likelihood of mechanical displacement of components during use, requiring no maintenance or adjustment.

A further feature resides in the use of a single coil of wire as both a depletion layer terminal and heater.

BRIEF DESCRIPTION OF DRAWINGS

The specific details of a preferred embodiment of the invention, and their mode of functioning will be particularly pointed out in clear, concise and exact terms in conjunction with the following drawings wherein.

DESCRIPTION OF PREFERRED EMBODIMENT OF INVENTION

Figure 1:
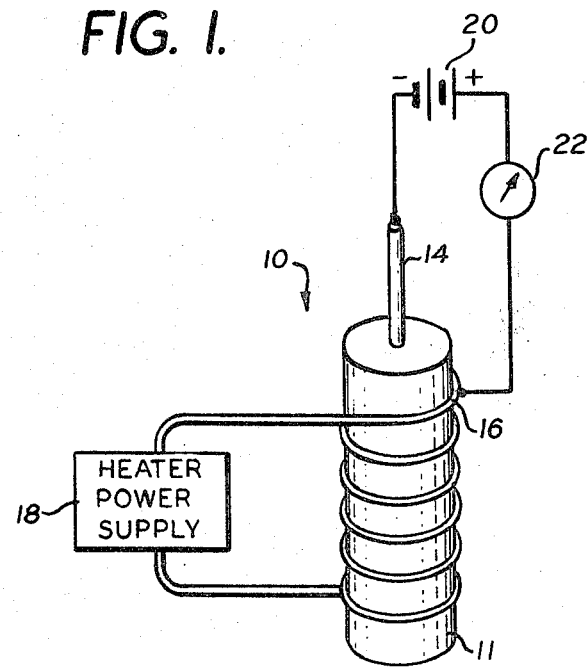
FIG. 1 is a perspective view of a sensor embodying the teachings of the invention shown connected in a schematically illustrated circuit.

Referring now more particularly to the drawings, like numerals will be employed to designate like parts in the different figures of the drawings.

The sensor 10 as illustratively shown is formed of a symmetrical cylindrical configuration. This illustrated preferred embodiment is shown intended for the sensing of halogen containing gases, in which case the sensing element 11 is formed of a glass-ceramic material comprising a mixture of sodium or lithium silicate, lanthanum oxide, and lanthanum fluoride. The lanthanum oxide or lanthanum fluoride can be substituted with oxides or fluorides of scandium, yttrium, aluminum, gallium and other rare earth metals or other metal oxides or fluorides or halides including bromides and fluorides. Though a variety of molar ratios may be employed a preferred molar ratio between the constituents has been found to be:

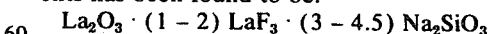

In the illustrated preferred embodiment the sensing element 11 is provided with an element terminal 14 which is preferably formed of a platinum wire. A platinum wire of 15 mil thickness has been found to produce eminently satisfactory results. This element terminal 14 as illustrated extends along the longitudinal axis through the cylindrical glass-ceramic sensing element 11.

A depletion layer terminal 16 is formed by a platinum wire secured to the outer surface of the cylindrically shaped glass-ceramic sensing element 11. This depletion layer terminal as illustratively shown is preferably formed by platinum wire of an 8 mil thickness coiled about the exterior surface of the sensing element 11.

This coil also serves as a heater coil by connection to a power supply 18.

Figure 2:
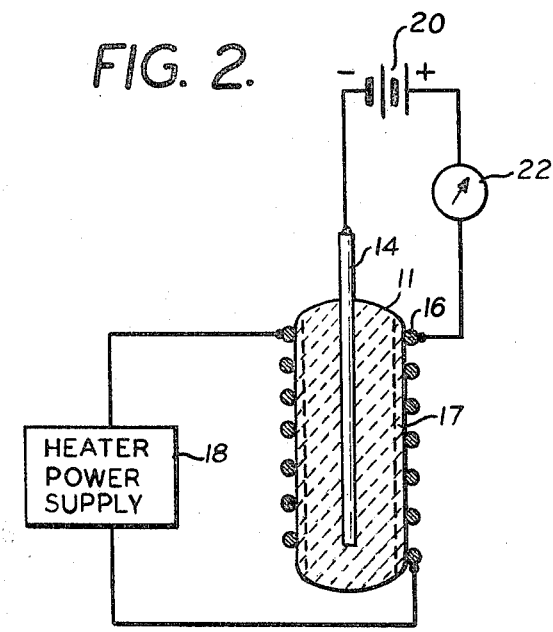
FIG. 2 is an enlarged longitudinal cross-sectional view through a sensor as shown in FIG. 1, shown connected in a schematically illustrated circuit.

A depletion layer 17 (schematically shown on FIG. 2 as the surface layer in the area between the dash lines and the surface of element 11) is formed at the surface of sensing element 11 by applying a voltage of between 1 and 10 volts across the sensing element terminal 14 and depletion layer terminal 16, and preferably by additionally heating the sensing element to a temperature above 500°C. In the illustrated preferred embodiment, utilizing a glass-ceramic formed of sodium silicate and a metallic oxide and fluoride such as lanthanum oxide and lanthanum fluoride, with the sensing element specifically responsive to halogen containing gases, the inner sensing element terminal 14 is negatively biased with respect to the depletion layer terminal 16. This is accomplished by connection to a battery 20 or the like. This is accomplished in utilizing the illustrated preferred embodiment of the invention by passing a current through the coil forming depletion layer terminal 16, which as shown in FIG. 2 is connected to heater power supply 18.

With a glass-ceramic sensing element 11 of a cylindrical configuration, as illustrated and formed of a length of between ¼ inch – 2 inch and a diameter of between 1 mm. and 20 mm. wound with a coil of a length of between 3 inches and 6 inches of an 8 mil. platinum wire, employing a heater power supply 18 providing 2–3 volts is found to provide sufficient heat to form the necessary depletion layer on the surface of cylindrically shaped sensing element 11.

OPERATION

The above described illustrated preferred embodiment of the invention may be efficiently formed by mixing a slurry of sodium silicate, lanthanum fluoride, and lanthanum oxide in the following weight ratio:

$Na_2SiO_3$ — 2.5 grams
$La_2O_3$ — 1.3 grams
$LaF_3$ — 1.6 grams

A length of 15 mil platinum wire forming element terminal 14 cut to a length of approximately three-fourths inch and from one-half to three-fourths the length of the wire is coated with the slurry to a thickness of approximately one-eighth inch and air dried. A coil of 8 mil platinum wire forming heating coil and depletion layer terminal 16 is formed of an approximately 4 inches length of wire with an internal coil diameter permitting free positioning of the slurry coated 15 mil wire within the coil. A final slurry coat is applied to the air dried slurry and the coil is positioned over the wet slurry coated 15 mil wire. The assembled sensing element terminal 14, slurry coating forming sensing element 11 and depletion layer terminal 16 are then fired at a temperature of approximately 500°C.

Thereafter the necessary depletion layer is formed on and adjacent the surface of the glass-ceramic sensing element 11 by connecting terminals 14 and 16 across a biasing D.C. voltage of 1–10 volts and by connecting coil 16 to a heater power supply to produce a coil temperature in excess of 500°C., a 600°C. temperature being preferred. Use of a 3 volt D.C. battery for the biasing voltage power supply 20 with the negative pole of biasing battery 20 connected to element terminal 14 provides satisfactory results. The necessary depletion layer is formed in approximately 24 to 48 hours.

An ammeter 22 or the like signalling device responsive to the flow of current in the circuit between terminals 14 and 16 is arranged in the circuit. The ammeter 22 is illustratively shown as arranged in series with the sensor 11 and the biasing voltage power supply 20.

Conditioning of the glass-ceramic sensing element 11 to form the depletion layer is accomplished by closing the circuit between the biasing power supply 20 and terminals 14 and 16; and between heater power supply 18 and coil 16 for a period of between 24 and 48 hours. Initially a current higher than one milliampere passes through the sensor, but after about 24 hours, the current decreases to less than 10 microamperes at which time the glass-ceramic sensing element becomes extremely sensitive to the presence of a halogen containing gas.

Thereafter if a halogen containing gas such as Freon is present in the atmosphere adjacent glass-ceramic sensing element 11, the current passing through the sensing element increases as will be indicated on the ammeter. Thus a concentration of 20 parts per billion of Freon 12 (dichlorodifluoromethane – $CCl_2F_2$) is found subject to detection.

The method of operation of the sensing element is based on the fact that under a D.C. potential difference between points on the solid state glass-ceramic sensing element containing alkali metal ions as in the above described embodiment, the positively charged ions migrate from the positively connected depletion layer terminal 16 to the negatively connected element terminal 14. Because the alkali metal ions are the majority carriers, a depletion layer is formed adjacent the positively connected depletion layer terminal 16. As described this depletion layer terminal 16 is formed by a wire coil extending over the surface of the cylindrically shaped sensing element 11, as a result of which the depletion layer is formed at the surface of the sensing element. Due to the small number of carriers in this surface region the depletion layer provides a high resistance region at the surface, and the conduction between the terminals 14 and 16 becomes very small.

In the presence of a halogen containing gas, the negative ions of this gas will accumulate on the depletion layer of the sensing element. In order to maintain an electrical balance, some of the positively charged alkali metal ions accumulated on the element terminal 14 will migrate to the depletion layer, thus increasing carrier concentration in the depletion layer so as to increase the current flow between the terminals 14 and 16.

When the halogen ions desorb from the depletion layer surface, the alkali metal ions again migrate to the negatively connected sensing element terminal 14 in the interior of the sensing element 11.

Heating of the atmosphere by energizing the circuit from coil 16 to heater power supply 18 of course aids in cracking any halogen containing gases in the atmosphere of the sensing element 11.

It is thus seen that a relatively simple solid state device has been provided for sensing the presence of a given gas in an atmosphere. The device lends itself to relatively inexpensive fabrication into a relatively small compact unit subject to energization by relatively small portable power supplies such as dry-calls or the like, and may readily be made specifically sensitive to halogen containing gases by the inclusion of readily available alkali metals.

The above disclosure has been given by way of illustration and elucidation and not by way of limitation, and it is to be understood that different embodiments of the inventive concept may be evolved within the scope of the appended claims.

What is claimed is:

1. A solid state sensor for detecting the presence of given constituents of an atmosphere, said sensor comprising: a glass-ceramic sensing element, which consists of compositions of alkali metal ion containing metal salts selected from the classes including sodium or lithium silicate, lanthanum oxide or fluoride, and oxides or fluorides of scandium yttrium, gallium, and other rare earth metals, or aluminum, and halides; a depletion layer on a surface of said sensing element formed by the migration of the alkali metal ions to said surface exposed to the atmosphere; a source of biasing potential; a sensing element terminal on said sensing element at a point spaced from said depletion layer and connected to said biasing potential source; means for heating said sensing element; and a depletion layer terminal spaced from said sensing element terminal and connected to said biasing potential source to form an electrical circuit through said sensing element across said depletion layer.

2. A solid state sensor as in claim 1 specifically detecting the presence of halogen containing gases in an atmosphere.

3. A solid state sensor as in claim 1 in which said sensing element terminal is formed within the interior of said sensing element; and said depletion layer and depletion layer terminal are formed on an outer surface of said sensing element.

4. A solid state sensor as in claim 3 in which said depletion layer terminal is wound over the surface of said sensing element.

5. A solid state sensor as in claim 3 in which said sensing element comprises a cylindrically shaped glass-ceramic element; said sensing element terminal comprises an elongate wire extending axially in said sensing element; and said depletion layer terminal comprises a wire coiled around the surface of said cylindrically shaped sensing element.

6. A solid state sensor as in claim 2 in which said sensing element comprises a glass-ceramic comprising a mixture of lanthanum oxide, lanthanum fluoride, and sodium silicate in a molar ratio of $La_2O_3 \cdot (1-2) LaF_3 \cdot (1-4.5) Na_2SiO_3$.

7. A solid state sensor as in claim 6 in which said sensing element terminal comprises a platinum containing wire extending in the interior of said sensing element; and said depletion layer terminal comprises a coil of platinum containing wire coiled around the surface of said sensing element.

8. A solid state sensor as in claim 4 in which said depletion layer terminal is connected to a heater power supply.

9. A solid state sensor as in claim 1 in which said glass-ceramic sensing element comprises a mixture of lanthanum oxide, lanthanum fluoride, and soidum silicate formed into a cylindrical shape; said sensing element terminal comprises a platinum wire extending along the longitudinal axis of said cylindrically shaped sensing element; said depletion layer terminal comprises a coil of platinum wire wound over the surface of said cylindrically shaped sensing element; said biasing potential source having a negative connection to said sensing element terminal and a positive connection to said depletion layer terminal; and a heater power supply, said coil coupled in a circuit to said heater power supply.

10. A method of forming a gas or vapor sensing element comprising the steps of coating a conductor with a slurry containing ion containing alkali metal salts; drying the slurry; and arranging a conductor in contact with the surface of the dried slurry coating the conductor; heating said element and establishing a biasing potential difference between the coated conductor and the surface contacting conductor to form a depletion layer by causing a migration of said metal ions toward the negatively connected conductor.

11. A method as in claim 10 comprising the steps of forming the slurry with which the conductor is coated of a mixture of sodium silicate, lanthanum fluoride, and lanthanum oxide.

12. A method as in claim 11 in which said conductors are formed of platinum containing wire.

13. A method as in claim 10 in which said surface contact conductor is formed of a coil of wire wound around the slurry coating.

14. A method as in claim 13 in which said coil of wire is connected to a heater power supply.

15. A method of sensing the presence of a gas or vapor in an atmosphere, said method comprising the steps of: positioning a solid state element consisting of alkali metal ion containing compositions of metal salts selected from the classes including sodium or lithium silicate, lanthanum oxide or fluoride, and oxides or fluorides of scandium, yttrium, gallium, and other rare earth metals, or aluminum, and halides in the atmosphere in which the gas or vapor is to be sensed; establishing a voltage difference across said solid state element to cause migration of the alkali metal ions to form a depletion layer on a portion of the surface of the solid state element exposed to the atmosphere; heating said solid state element; establishing a circuit between opposite sides of the depletion layer; and sensing the flow of current through said circuit.

16. A method as in claim 15 comprising the step of heating the atmosphere adjacent the depletion layer to ionize the gas or vapor adjacent the depletion layer.

17. A method as in claim 15 for specifically sensing halogen containing gases or vapors comprising the step of forming the solid state element of a mixture of sodium silicate, lanthanum fluoride, and lanthanum oxide.

18. A method as in claim 15 comprising the step of forming platinum containing terminals on the solid state element between which terminals the voltage difference is established.

19. A method as in claim 16 in which said heating step is performed by forming a coil of wire about the solid state element, and establishing a current flow through the coil of wire.

* * * * *